United States Patent

Bennett

[15] 3,682,274

[45] Aug. 8, 1972

[54] AIR LINE OILER
[72] Inventor: Kenneth V. Bennett, 5505 Indigo Rd, Richmond, Va. 23230
[22] Filed: Dec. 23, 1970
[21] Appl. No.: 100,919

[52] U.S. Cl. ................................184/55 A, 92/154
[51] Int. Cl. ..............................................F16n 7/34
[58] Field of Search ......184/55, 55 A, 56, 56 A, 7 D; 92/154, 156

[56] References Cited

UNITED STATES PATENTS

| | | | |
|---|---|---|---|
| 1,721,231 | 7/1929 | Osborne | 184/55 A |
| 3,261,426 | 7/1966 | Kuhlman | 184/55 A |
| 2,925,148 | 2/1960 | Mosher | 184/55 A |
| 2,571,098 | 10/1951 | Arnold | 184/55 A |
| 3,581,845 | 6/1971 | Van Nederynen | 184/56 A |

Primary Examiner—Manuel A. Antonakas
Attorney—Griffin, Branigan & Kindness

[57] ABSTRACT

An air line oiler suitable for lubricating pneumatically driven tools provides a small amount of oil each time the tool is turned on. The oiler is attached in the air supply line at the tool and includes first and second flexible hoses forming an annular oil reservoir surrounding an air supply passage. Coupling elements close the ends of the reservoir and provide means for attaching the oiler to the tool and air supply line. A piston is located in a chamber in one coupling element, the chamber communicating with the oil reservoir and the air supply passage. When the tool is off, air pressure from the supply line compresses the piston against oil in the reservoir and a small amount of oil leaks around the piston. Thereafter, when the tool is turned on the pressure in the oil reservoir drives the piston thereby discharging a small amount of oil into the air line at a point near the tool.

15 Claims, 8 Drawing Figures

PATENTED AUG 8 1972 3,682,274
SHEET 1 OF 2
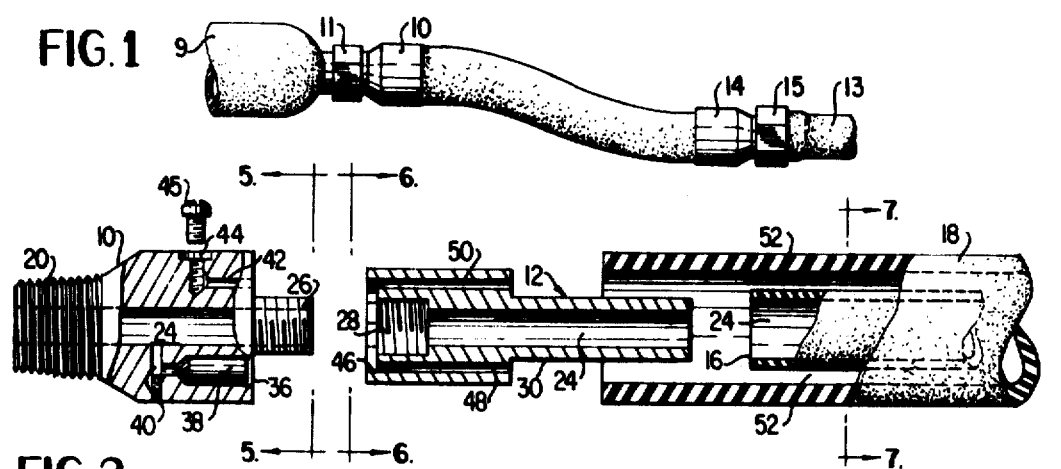
FIG. 1
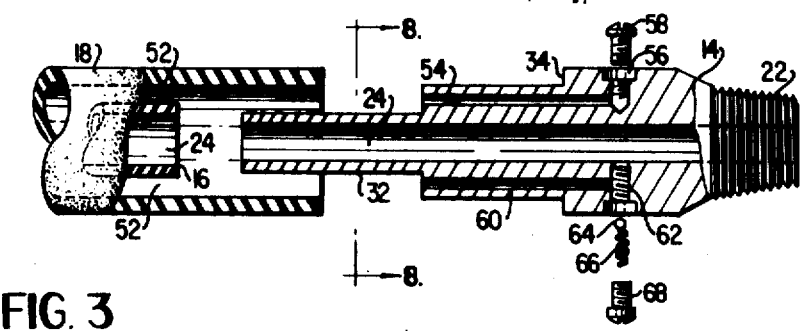
FIG. 2
FIG. 3
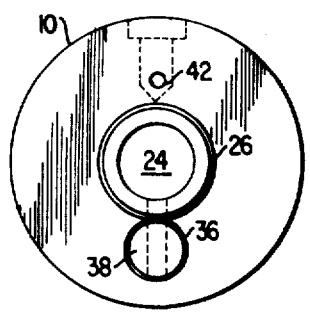
FIG. 5
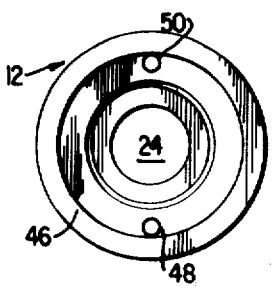
FIG. 6
INVENTOR
KENNETH V. BENNETT
BY Griffin, Branigan & Kindness
ATTORNEYS

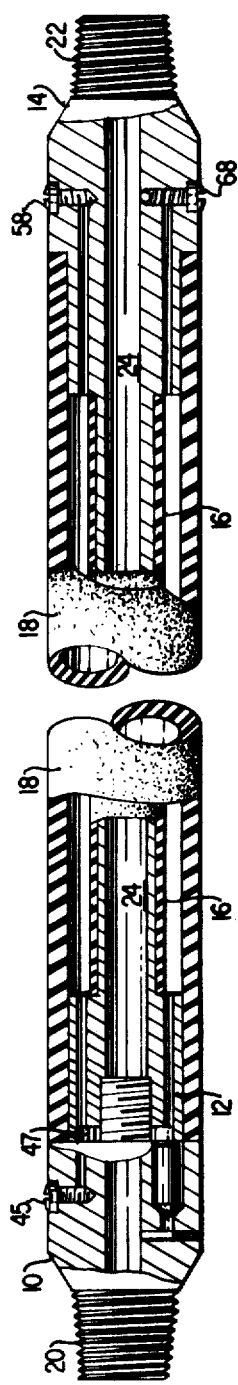
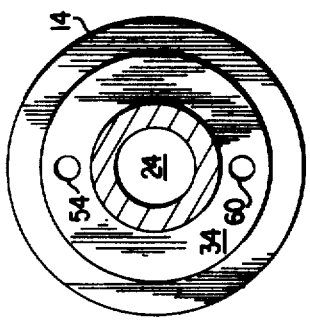
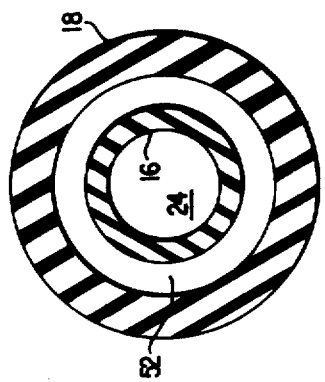
INVENTOR
KENNETH V. BENNETT
ATTORNEYS

AIR LINE OILER

BACKGROUND OF THE INVENTION

The present invention relates to lubrication devices and more particularly to that class of lubricators known as air line oilers. Air line oilers are employed to lubricate pneumatically driven tools by mixing oil with the air used to drive the tool.

Air line oilers of various types are known in the art. Some of these devices employ the Venturi effect. That is, air flowing through the line toward the tool sucks air from the oil reservoir. As long as the tool is operating oil is sucked from the reservoir and supplied to the tool. It is impossible to meter these devices so that they supply only the minute quantity of oil needed to lubricate the tool. For example, one typical prior art device having a one-quarter inch air line and an eight ounce oil reservoir uses the entire contents of the oil reservoir in forty hours of constant operation. This is far more oil than is required to lubricate the tool and the excess is blown through the tool to contaminate the air. Furthermore, since the oil reservoir of these devices is emptied in a relatively short time, and since operators frequently forget or neglect to refill the oil reservoirs, tools may be operated for long periods of time with no lubrication at all.

Another disadvantage of prior art oilers is that they are bulky. It is desirable that the oiler be located at the tool in order to avoid contaminating the air line with oil. For example, around ship yards an air line may be used to supply air under pressure to a pneumatic tool and may then subsequently be used to supply air under pressure to a diver. If the oil used to lubricate the tool contaminates the air line then the air line cannot then subsequently be used to supply air to the diver.

Heretofore, air line oilers suitable for insertion between the air line and the tool have been rigid and bulky. This makes it cumbersome to handle the tool and may in extreme cases restrict the uses of the tool. In an effort to reduce the bulk of these devices, it has been a common practice to provide a separate oil reservoir which is usually mounted overhead in the area where the tool is being used. However, personnel frequently fail to refill the reservoirs hence the tools are frequently operated without any lubrication at all.

A further disadvantage common to most prior art air line oilers is that they are based on a principle which requires some form of restriction or impediment in the air line itself.

BRIEF DESCRIPTION OF THE INVENTION

An object of the present invention is to provide an air line oiler having none of the disadvantages of the prior art devices described above.

An object of the present invention is to provide an air line oiler that is small and flexible and includes a self contained oil reservoir.

Another object of this invention is to provide an air line oiler that is small and flexible and suitable for attachment to a tool and an air line.

Another object of this invention is to provide an air line oiler capable of lubricating a pneumatically actuated tool without over-lubricating the tool.

Another object of the invention is to provide a simple and inexpensive air line oiler employing a single piston operable in response to air line pressure for injecting a minute quantity of oil into the air line each time there is a pressure drop in the air line.

The above and other objects of the invention are accomplished by provisions of an air line oiler comprising first and second flexible hoses disposed so as to define between them an oil reservoir, first and second coupling means for closing the ends of the annular region and providing means for attaching the oiler to an air line and a tool, a chamber in the first coupling means, said chamber communicating with the oil reservoir and an air supply passage which extends through both the coupling means and said first hose, a piston in the chamber, a fluid passage in the other coupling means connected between the air supply passage and the oil reservoir, and a check valve in the fluid passage. The piston is made slightly smaller than the chamber so that there is a slight but controlled leakage of oil around the piston. When a tool is turned off the pressure in the air supply passage drives the piston against the oil and a small amount of oil leaks around the piston into the chamber. As the piston is driven against the oil, air pressure in the supply passage opens the check valve to equalize the pressure in the oil reservoir and the supply passage. Subsequently, when the tool is turned on and the pressure in the air supply passage drops, the pressure of the oil in the reservoir drives the piston in the opposite direction thereby forcing a small quantity of oil into the air supply passage from whence it is swept into the tool.

Other objects of the invention and its mode of operation will become apparent from the following description and accompanying drawings.

BRIEF DESCRIPTION OF DRAWINGS

FIG. 1 is a view of the invention positioned between an air line and a tool;

FIG. 2 is a front exploded view partly in section, showing a left end coupling, hose adapter, and pieces of the hoses forming an oil reservoir;

FIG. 3 is a front exploded view, partly in section, showing a right end coupling and pieces of hoses forming an oil reservoir;

FIG. 4 is a front view, partly in section, showing an assembled air line oiler;

FIG. 5 is a sectional view taken along the line 5—5 of FIG. 2;

FIG. 6 is a sectional view taken along the line 6-6 of FIG. 2;

FIG. 7 is a sectional view of the hoses taken along the line 7—7 of FIG. 2; and, FIG. 8 is a sectional view taken along the line 8—8 of FIG. 3.

DETAILED DESCRIPTION OF THE INVENTION

Referring now to the drawings, an air line oiler constructed in accordance with the principles of the present invention comprises a first coupling means including a first coupling element 10 and a hose adapter 12, a second coupling means 14, a first or inner flexible hose 16, and a second or outer flexible hose 18. Coupling element 10 is threaded at 20 so that the coupling element may be coupled to a tool 9 by a coupling nut 11.(not Coupling means 14 is threaded at 22 so that it may be coupled to an air line 13 by a coupling nut 15.

Coupling element 10, hose adapter 12, and coupling means 14 each have an axially extending bore and, with the inner hose 16, form an unobstructed air supply passage 24 which extends throughout the length of the oiler when the oiler is assembled as shown in FIG. 4. Thus, air supplied under pressure to the coupling means 14 passes through the air supply passage 24 to the tool which may be attached to the coupling element 10.

The coupling element 10 has an externally threaded stub 26. Hose adapter 12 is internally threaded at 28 so that the hose adapter may be attached to the coupling element 10 by screwing it on to stub 26. The hose adapter is generally cylindrical in shape and has an extension 30 of reduced diameter which is inserted into the inner hose 16. The main body of the hose adapter is inserted into the outer hose 18 until it is flush with the end of the outer hose as shown in FIG. 4.

In like manner, the coupling means 14 is generally cylindrical in shape and has an extension 32 of reduced diameter which is inserted into the inner hose 16. The coupling means 14 is then inserted into the outer hose 18 until one end of the hose abuts the offset portion 34 of the coupling means. As is evident in FIG. 4, the inner hose 16 is shorter than the outer hose 18. Any conventional means such as clamps or adhesive may be employed to secure the hoses to the hose adapter 12 and the coupling means 14, to thereby prevent leakage of air and oil.

Coupling element 10 has a piston chamber 36 formed therein for receiving a piston 38. An oil exit passage 40 extends from one end of the piston chamber 36 to the air supply passage 24. Passage 40 may be formed by drilling inwardly from the outer surface of element 10, and then plugging the outermost portion of the hole so as to prevent leakage from passage 40 to the atmosphere. Also formed within the coupling element 10 is an oil fill passage 42 which terminates at an oil fill opening 44. The coupling element 10 is threaded at the oil fill opening to receive a screw 45 which prevents oil from leaking out of the device once it has been filled.

The piston chamber 36 and the oil fill passage 42 extend to the right surface of the coupling element 10. The threaded portion of hose adapter 12 is recessed in the left surface of the adapter so as to form an annular lip 46 which mates with the right surface of coupling element 10 when the two parts are assembled. When thus assembled, an annular region is formed between the two parts and around stub 26. This region connects the oil fill line 42 with the piston chamber 36. Furthermore, the hose adapter 12 has two oil flow passages 48 and 50 extending parallel to its axis. These passages provide paths for the flow of oil from the oil fill opening 44 to the oil reservoir 52 which is formed as an annular region between the inner and outer hoses 16 and 18. Furthermore, these passages also provide for the free flow of oil from the reservoir 52 to the piston chamber 36.

The coupling means 14 has an oil fill passage 54 formed therein which terminates at an oil fill opening 56. The coupling means is threaded at the opening 56 to receive a closure screw 58. When the oiler is assembled, the oil fill passage 54 forms a flow path between oil fill opening 56 and the oil reservoir 52, as best seen in FIG. 4.

An air flow passage means is formed in the coupling means 14. The air flow passage means includes a first air flow passage 60 (FIG. 3) extending parallel to the axis of the coupling means and an air flow passage 62 extending radially of the coupling means. Air flow passages 60 and 62 intersect each other and air flow passage 62 intersects the air supply passage 24 so that when the oiler is assembled an air flow path exists between the air supply passage and the oil reservoir 52. A check valve comprising a ball 64 and a spring 66 are held in place in the passage 62 by a retaining screw 68. As more fully explained hereafter, the ball check valve permits air to enter the oil reservoir when the oil supply passage 24 is pressurized, but blocks the leakage of oil or air from the reservoir when the pressure in supply passage 24 drops.

The air line oiler is utilized as follows. The coupling means 10 is coupled to a tool by the coupling means 11 as illustrated in FIG. 1, and the coupling means 14 is coupled to the air supply line 13 by a coupling means 15. It will be understood by those familiar with the art that the air supply line 13 is connected to a source which provides air under pressure. Furthermore, it will be understood that air from the line 13 is blocked at the tool and may flow through the tool only when a control element on the tool is actuated.

After the oiler is inserted between the tool and the air line, it may be filled with oil if it has not already been filled. This is accomplished by removing the oil fill screws 45 and 58 and inserting oil through one of the oil fill openings 44 or 56. Assuming that the oil is inserted through oil fill opening 44, the air in reservoir 52 escapes through passage 54 and oil fill opening 56 as the reservoir is filled with oil. After the reservoir is filled, the screws 45 and 58 are replaced in the coupling elements to prevent leakage of the oil from the reservoir.

Assuming that the tool is off and that air under pressure is being supplied through air line 13, an air pressure is developed in air supply passage 24. This pressure is communicated by way of passage 40 to the piston chamber 36 thus driving the piston 38 against the oil stored in the reservoir. Furthermore, the pressurized air in supply passage 24 actuates the check valve so that air flows through the passage 60 into the oil reservoir 52. When the pressure in the oil reservoir has been raised to equal the pressure in the air supply passage 24, the check valve closes.

The oil forced into the front (left as viewed in drawing) of piston 38 remains in the chamber 36 until such time as the tool is actuated. When the tool is actuated air flows from the air line 13 through the air supply passage 24 to the tool. As the air begins to flow the pressure in air supply passage 24 drops below the pressure in the oil reservoir 52 so the pressure in the reservoir drives the piston 38 toward the left thereby forcing the oil in chamber 36 out through passage 40 into the air supply passage 24. The air flowing through the air supply passage then carries the oil into the tool where it performs the lubricating function.

As long as the tool remains on, the piston 38 is retained by the pressure in the oil reservoir so that it is seated against the left end of chamber 36. Preferably, the left wall of chamber 36 has a different angle of slope from that of the left end of piston 38 so that there is only a ring of contact between the piston and the chamber wall when the piston is seated against the wall. The piston remains seated against the chamber wall as long as the tool remains on, thereby preventing further oil from bypassing the piston.

When the tool is turned off, the flow of air through air supply passage 24 stops and the pressure in the passage increases. Air from the supply passage is forced through passage 40 and into chamber 36 thus driving the piston 38 against the oil supplied from the reservoir. Again, a small quantity of oil leaks around the piston into the left portion of chamber 36. Also, the check valve opens so that air from the supply bore may pass through passage 60 to again pressurize the oil in reservoir 52 and equalize the pressure on both sides of the piston 38. When the pressure on opposing sides of the piston 38 become equal, the flow check valve again closes. The air line oiler is now ready for another cycle of operation which begins only after the operator has again actuated the tool so that air flows through the supply passage 24.

From the foregoing description it is evident that the diameter of chamber 36 with respect to the diameter of piston 38 is critical since it is this dimension which governs the amount of oil which is injected into the supply passage 24 each time the tool is turned on. Thus, the relative dimensions of these elements will be governed by the lubrication needs of the tool to which the oiler is attached. In a typical embodiment such as might be used with a drill or die grinder, the diameter of piston 38 may be 0.125 inch and the diameter of chamber 36 may be 0.0002 inch larger. In such an application the diameter of air supply passage 24 may be ¼ inch and the diameter of coupling element 10 need be no more than 1 inch.

One advantage of the present invention is its flexibility and light weight which permit it to be attached to a tool without unduly restricting freedom of movement of the tool. Therefore, the coupling means and hose adapter should be constructed of a light weight machinable material and may, for example, be made of aluminum. The flexibility of the oiler is determined primarily by the flexibility of the inner and outer hoses 16 and 18. Therefore, these hoses should be made of an oil resistant thin-walled resilient material and may, for example, be made of Tygon with a nylon braided cover. Inner hose 16 may have an internal diameter of ⅜ inch with a wall thickness of 1/16 inch and the outer hose 18 may have an internal diameter of ¾ inch with a wall thickness of ⅛ inch.

In summary, the present invention provides an air line oiler that is flexible and light weight and does not restrict the maneuverability of a tool to which it may be directly attached. The oiler conserves lubricant by injecting only a small predetermined amount each time the tool is actuated. In a typical application, the present oiler will supply 5 ounces of oil to a tool during a year whereas Venturi type oilers in a similar application will supply 8 ounces of oil in one week. Since the present invention supplies adequate oil for lubrication, a considerable saving is achieved. Furthermore, the oil is injected into the air supply passage at a point closely adjacent to the tool thereby avoiding the problem of contaminating an air supply line with the oil. Since the oiler does not over supply oil, it needs less refilling than prior art oilers and does not contaminate the work area by causing excess lubricant to be expelled into the atmosphere through the tool. Also, because it is located at the tool it is more convenient and easier to refill than prior art oilers.

While specific embodiment of the invention has been described in detail, it will be understood that various modifications and substitutions may be made in the described embodiment without departing from the spirit and scope of the invention as defined in the appended claims. For example, coupling means 14 need not be a single element but may comprise a hose adapter and coupling elements as in coupling means 10.

The embodiment of the invention in which an exclusive property or privilege is claimed is defined as follows:

1. An oiler for injecting a predetermined quantity of oil into an air supply line each time the pressure in said line drops, said oiler comprising:

first means defining an oil reservoir adjacent an air supply passage and including means for coupling said air supply passage as an extension of said air supply line;

means defining a piston chamber and flow passages connecting said piston chamber to said oil reservoir and said air supply passage;

a free piston in said chamber, said piston being free to move in one direction in response to pressure in said air supply passage and in the opposite direction in response to pressure in said reservoir;

said piston having a smaller dimension than said chamber in a direction transverse to its axis of movement whereby a predetermined quantity of oil may leak past said piston each time the pressure in said air supply passage increase to thereby drive said piston against the oil in said reservoir; and, means for equalizing the pressure on both sides of said piston, after it has acted against said oil in said reservoir, by raising the pressure in said reservoir to the pressure in said air supply passage;

whereby each time the pressure in said air supply passage drops, the pressure in said reservoir drives said piston to one extent of said chamber to thereby eject into said air supply passage the oil which has leaked past said piston.

2. An oiler as claimed in claim 1 wherein said pressure equalizing means comprises a flow passage extending between said reservoir and said air supply passage, and a flow check means for permitting flow through said last named flow passage only when the pressure in said air supply passage exceeds the pressure in said reservoir.

3. An oiler as claimed in claim 2 wherein said first means defining an oil reservoir adjacent an air supply passage comprises first and second flexible hoses, one of said hoses being smaller than, and disposed in, the other, the annular region between said hoses being said oil reservoir and the air supply passage being the hole extending through the inner hose.

4. An oiler as claimed in claim 3 wherein said first means further comprises first and second coupling means each having a bore extending therethrough, each said coupling means including an extension for receiving said inner hose and holding it in alignment with the bore whereby said hose and said bores form a continuous unobstructed air supply passage extending through said oiler.

5. An oiler as claimed in claim 4 wherein said first and second coupling means close opposing ends of said annular region to form said oil reservoir.

6. An oiler as claimed in claim 5 wherein one of said coupling means includes said means defining said piston chamber and air flow passages connecting said piston chamber to said oil reservoir and said air supply passage.

7. An oiler as claimed in claim 6 wherein said flow passages containing said flow check means is formed in one of said coupling means.

8. An oiler as claimed in claim 7 and further including an oil fill passage extending through one of said coupling means from said reservoir to the outer surface of said one coupling means, and means for closing said oil fill passage to prevent leakage.

9. An oiler as claimed in claim 7 and further including an oil fill passage in each of said coupling means and extending from said oil fill reservoir to the outer surfaces of said coupling means, and means for closing said oil fill passages to prevent leakage.

10. An oiler as claimed in claim 1 wherein one end of said piston chamber is shaped to coact with said piston to form a seal preventing leakage of oil past said piston when said piston is seated against said one end in response to pressure in said oil reservoir.

11. An oiler as claimed in claim 10 wherein said one end of said piston chamber and said piston are shaped such that a line of contact is made between them to form said seal.

12. An air line oiler for use in the air supply line to a pneumatic tool, said oiler comprising:
    first coupling means for coupling said oiler to said tool;
    second coupling means for coupling said oiler to said air supply line;
    first and second flexible hoses, said hoses being of different diameters and disposed one within the other and between said coupling means to thereby define an oil reservoir;
    each of said coupling means having a bore extending therethrough, said bores and the inner flexible hose defining an air supply passage extending throughout the extent of the oiler whereby air may flow through said oiler from said air supply line to said tool;
    a piston chamber formed within one of said coupling means;
    flow passage means extending from said piston chamber to said air supply passage;
    oil flow passage means extending from said oil reservoir to said piston chamber;
    a piston within said chamber for limiting oil flow from said oil flow passage means to said flow passage means,
    the dimensions of said piston being slightly smaller than the dimension of said chamber in the direction transverse to the direction of movement of said piston to thereby permit a predetermined leakage of oil from said reservoir past said piston; and
    means for raising the pressure in said oil reservoir to the pressure in said air supply passage each time said tool is cut off, the pressure in said air supply passage acting through said flow passage to drive said piston to compress the oil in said reservoir until the pressures on said piston are equalized,
    whereby oil which leaks past said piston into said chamber when said piston compresses the oil in said reservoir is injected into said air supply passage through said flow passage means when the tool is turned on and the pressure in said air supply passage drops.

13. An oiler as claimed in claim 12 wherein one of said coupling means comprises a coupling element and a hose adapter,
    said hose adapter being positioned in and closing one end of the outer hose and including an extension, said extension being inserted into said inner hose,
    said hose adapter being internally threaded on the end opposite said extension,
    said coupling element having an externally threaded stub extending from one surface for receiving said adapter.

14. An oiler as claimed in claim 13 wherein the surface of said adapter which mates with said one surface of said coupling element comprises an annular surface whereby an enclosed annular space is formed when said coupling element and hose adapter are assembled,
    said oil flow passage means including said annular space and at least one passage extending from said annular region through said hose adapter to said oil reservoir.

15. An oiler as claimed in claim 14 and further comprising means for filling said reservoir, said filling means including an oil fill passage extending through said coupling element from an outer surface to said annular region.

* * * * *